Patented Jan. 19, 1943

2,308,640

UNITED STATES PATENT OFFICE 2,308,640

LIPOPHILIC SUBSTANCE

Ernst Bergmann, Felix Bergmann, and Leon Haskelberg, Rehoboth, Palestine

No Drawing. Application August 17, 1939, Serial No. 290,668

9 Claims. (Cl. 260—196)

Our invention relates to lipophilic chemotherapeuticals. In the context of this specification and the appended claims, this term is meant to cover substances of the cyclic series which are known to possess chemotherapeutical properties, or which, according to their molecular structure, may be presumed to have such properties.

It is one object of this invention to make chemotherapeuticals capable of mixing with, or dissolving in, lipoids, that is, fat, wax or the like water-insoluble substances.

It is a further object of our invention to provide for lipophilic chemotherapeuticals capable of acting on such bacteria as can not, or almost not, be influenced by non-lipophilic substances, owing to their having cell-walls largely consisting of lipoids, or to their being embedded in lipoid tissues of the host body.

It is another object of the invention to provide for such lipophilic chemotherapeuticals as have the property of coloring lipoids which makes them suitable for use for microscopical or other analytical purposes, or for coloring fatty comestibles, especially butter or margarine.

Lipophilic substances according to this invention consists of chemotherapeuticals within the meaning of the definition given above, the molecule of which contains at least two halogen atoms organically bound, i. e., bound to one or more carbon atoms but not in salt- or ester-like form, in one or more aliphatic chains, saturated or unsaturated, linked to a nitrogen atom present as a nuclear substituent.

The substances to which this invention relates more particularly are selected from the following groups:

A. Azo compounds, further substituted, if desired, by other groups, such as, for example, sulfonic or arsonic acid groups or their amides.
B. Isocyclic compounds (other than azo-compounds) with nuclear substitution by sulfonic acid or sulfonamide groups.
C. Isocyclic compounds (other than azo-compounds), containing arsenic.

All of them may have further substituents, for example, amino groups.

The following examples of substances and processes for their preparation serve to illustrate the invention which, however, is not limited to these examples. Of the substances named in these examples, a number has the character of dyestuffs and can, therefore, be used as such, for example, in order to make lipoids microscopically visible.

EXAMPLE 1

*N-trichloroacetyl-4-benzene-azo-1-naphthylamine*

5 grs. of 4-benzene-azo-1-naphthylamine and 5.2 grs. of anhydrous potassium carbonate are mixed with 50 cc. of benzene, and 36 grs. of trichloroacetyl chloride are added which causes a slight rise in temperature. The solution is boiled for 6 hours, filtered while hot, and half of the solvent is evaporated. After cooling, the precipitate is filtered off and recrystallized from alcohol.

The N-trichloroacetyl-4-benzene-azo-1-naphthylamine obtained forms dark-red rhombohedra which on exposure to air lose their form and turn into a light-brown powder. The substance is soluble in carbon tetrachloride and arachide oil; concentrated sulfuric acid gives a violet-red solution. The substance has the composition $C_{18}H_{12}ON_3Cl_3$ and melting point 153.5° C.

The same substance can be prepared by the following alternative method: 5 grs. of the azo dye named are dissolved in a mixture of 50 cc. of chloroform and 1.6 cc. of pyridine, and 3.6 grs. of trichloroacetyl chloride are added at 0° C. After 12 hours' standing at room temperature the chloroform solution is washed with water, dilute sulfuric acid and again with water, dried, evaporated and the residue recrystallized from ligroine.

EXAMPLE 2

*N-trichloroacetyl-1-benzene-azo-2-naphthylamine*

5 grs. of 1-benzene-azo-2-naphthylamine are mixed with 5.2 grs. of anhydrous potassium carbonate and 50 cc. of benzene, and 3.6 grs. of trichloroacetyl chloride are added. The mixture is boiled for 6 hours, the solvent evaporated and the residue recrystallized from alcohol. The above named substance so formed is obtained in light red needles of melting point 130° C. As a powder it is brown. Its composition is $C_{18}H_{12}ON_3Cl_3$.

EXAMPLE 3

*N-trichloroacetyl-1-(p-carbethoxy-benzene)-azo-2-naphthylamine*

The starting azo-dye which has so far been unknown, is synthetised in the following way: 16.5 grs. of ethyl p-amino-benzoate are dissolved in a mixture of 30 cc. of concentrated hydrochloric acid and 50 cc. of water and diazotised by means of a solution of 7 grs. of sodium nitrite in 30 cc. of water. The diazonium compound is added to a solution of 14.7 grs. of β-naphthylamine in 250 cc. of alcohol. Crimson-red crystals separate; they are filtered, washed with water until the filtrate is colourless, and recrystallized from alcohol. Yield: 27 grs. The substance has a melting point of 183° C. It is soluble in chloroform, insoluble in benzine. Its composition is $C_{19}H_{17}O_2N_3$.

6.2 grs. of this dyestuff are dissolved in a mixture of 50 cc. of chloroform and 1.6 cc. of pyridine. At 0° C., 1.6 grs. of trichloroacetyl chloride in 25 cc. of chloroform are added, whereupon part of the condensation product crystallizes spontaneously. After 12 hours' standing the solution is brought to dryness in vacuo, the crystals are washed with water, dried, and recrystallized from glacial acetic acid, then from butyl alcohol. The product is in the form of red needles of melting point 206° C. and composition $C_{21}H_{16}O_3N_3Cl_3$. The yield is 96%.

EXAMPLE 4

*N-trichloroacetyl-1-(p-carboxy-benzene)-azo-2-naphthylamine*

The basic azo-dye has been described before: Beilstein, suppl. vol. 16, p. 33. Its sodium salt is prepared by dissolving the acid in the equivalent amount of a 10 per cent. hot aqueous sodium carbonate solution. On cooling the salt separates in the form of orange-red leaflets.

3 grs. of the sodium salt are suspended in 20 cc. of xylene and, after addition of 2 grs. of trichloroacetyl chloride, boiled for 2 hours. The mass is cooled, filtered, powdered, washed with cold water, dried and recrystallized from butyl acetate. The product is obtained in clusters of needles melting at 246° C. (under decomposition). It is insoluble in methyl alcohol, and slightly soluble in ethyl alcohol. Its composition is $C_{19}H_{12}O_3N_3Cl_3$.

EXAMPLE 5

*N-trichloroacetyl-1-(p-carboxy-benzene)-azo-1-naphthylamine*

The starting dyestuff is prepared in the following way:

16.5 grs. of ethyl p-aminobenzoate are dissolved in a mixture of 50 cc. of water and 30 cc. of concentrated hydrochloric acid, and treated with a solution of 7 grs. of sodium nitrite in 30 cc. of water. The solution so obtained is poured out into a solution of 14.3 grs. of naphthylamine in 100 cc. of alcohol, whereupon the dark violet hydrochloride of the azo dye separates. It is filtered off, dissolved in boiling alcohol, and precipitated with double its volume of an alcoholic ammonia solution. After recrystallisation from alcohol, the substance forms brown needles exhibiting a green metallic lustre, and gives a dark red powder. It can be crystallized most conveniently from butyl alcohol. The product has the melting point 164° C. and the composition $C_{19}H_{17}O_2N_3$.

16 grs. of this dyestuff, dissolved in 200 cc. of chloroform and added to with 4 cc. of pyridine, are cooled to 0° C. and treated with a solution of 6 grs. of trichloroacetyl chloride in 50 cc. of chloroform. The dark crystalline magma is suspended in boiling alcohol and precipitated with alcoholic ammonia solution. The product is filtered and recrystallized from butyl alcohol and then from glacial acetic acid. Melting point 203° C.

EXAMPLE 6

*N-trichloroacroyl-4-benzene-azo-1-naphthylamine*

For the preparation of the required large quantities of trichloro-acrylic acid, the following convenient method has been worked out:

328 grs. of tetrachloroethylene in 472 cc. of chloroform are cooled to —10° C., and during 45 minutes 67 grs. of powdered aluminium chloride are added under constant stirring. After standing for one hour, the reaction mixture is heated to 100° C. for 6 hours and then poured out into ice water. The organic layer is thoroughly washed with water and distilled. The desired 1.1.1.2.2.3.3.-heptachloropropane boils at 122° under a reduced pressure of 26 mm. It crystallizes easily and has the melting point 30° C. The yield is 85%.

At a temperature of between 0° and 10° C., 225 cc. of a 25 per cent. methyl alcoholic potassium hydroxide solution are added drop by drop to 282 grs. of heptachloropropane. The reaction mixture is heated on a water bath for 10 minutes, diluted with water and extracted with ether. The hexachloropropylene so obtained boils at 100° C. under a reduced pressure of 45 mm. Yield 92%.

246 grs. of this latter substance are mixed with 206 grs. of concentrated sulfuric acid and with a solution of 2 grs. of aluminum sulfate in 20 cc. of water. The mixture is slowly heated in a large flask with round bottom and having a reflux condenser and an efficient stirrer. During 4 hours a temperature below 110° C. has to be maintained, for otherwise a violent explosion is bound to occur. The mixture is then heated for another 6 to 8 hours to 110 to 130° C., thereafter cooled down to room temperature, mixed with an equal volume of water, and cooled to 0° C. The crystals of trichloroacrylic acid thereby obtained are filtered off, and the mother liquor is thoroughly extracted with ether, whereby further fractions of the product are obtained. The whole of the product is recrystallized from low boiling petroleum ether. It forms rhombohedra of melting points 76° C. and is obtained in a yield of 140 grs.

The acid chloride is prepared from this acid by heating the latter for 24 hours with four times the theoretical amount of thionyl chloride. It is purified by distillation. Its boiling point is 159° C., its yield the theoretical one.

13.2 grs. of 4-benzene-azo-1-naphthylamine and 6 grs. of potasium carbonate in 60 cc. of benzene are added to with 9.6 grs. of trichloroacroyl chloride, and the mixture is boiled for 3 hours. The hot solution is decolorized with charcoal, filtered, and the crystals are washed with water. From butyl alcchol, brisk-red crystals of melting point 144° C. are obtained in a yield of 15 grs. The composition of the final product is $C_{19}H_{12}ON_3Cl_3$.

EXAMPLE 7

*N-trichloroacroyl-1-benzene-azo-2-naphthylamine*

13.2 grs. of 1-benzene-azo-2-naphthylamine and 6 grs. of potassium carbonate are mixed with 9.6 grs. of trichloroacroyl chloride and 60 cc. of benzene, and boiled for 3 hours. The hot solution is filtered, and the crystals obtained on cooling are collected and recrystallized from glacial acetic acid. The product is in the form of dark-red crystals exhibiting a violet-blue metallic lustre. On exposure to air they turn into a brown powder of melting point 174° C. and composition $C_{19}H_{12}ON_3Cl_3$.

EXAMPLE 8

*N-trichloroacroyl-1-(p-carbethoxy-benzene)-azo-2-naphthylamine*

16 grs. of 1-(p-carbethoxy-benzene)-azo-2-naphthylamine are dissolved in a mixture of 100 parts by volume of chloroform and 4 cc. of pyridine, and 9.6 grs. of trichloroacroyl chloride are added at 0° C. After standing for 12 hours, two thirds of the chloroform are evaporated in vacuo. The residue is treated with alcohol, filtered off and recrystallized from benzene or butyl alcohol. The product forms orange-red needles of melting point 193° C. and composition $C_{22}H_{16}O_3N_3Cl_3$.

EXAMPLE 9

*N-dichloroacetyl-4-benzene-azo-1-naphthylamine*

12.5 grs. of 4-benzene-azo-1-naphthylamine are dissolved in a mixture of 100 cc. of chloroform and 8 cc. of pyridine, and at ice temperature 8 grs. of dichloroacetyl chloride in 25 cc. of chloroform are added. After 12 hours' standing, part of the condensation product has crystallized. Two thirds of the chloroform are evaporated, and after cooling the crystals are collected and recrystallized from glacial acetic acid or butyl alcohol. The product forms brownish-yellow needles of melting point 214° C. and composition $C_{18}H_{13}ON_3Cl_2$. The yield is 16 grs.

EXAMPLE 10

*N-trichloroacetyl-2'-amino-naphthalene-(1-azo-1)-benzene-4-carbonamide*

The initial azo-dye which is unknown so far is prepared in the following way:

A solution of 8 grs. of p-amino-benzamide in 17 cc. of concentrated hydrochloric acid and 100 cc. of water is treated at ice temperature with 29.3 cc. of a 2-n-aqueous sodium nitrite solution, and the reaction product is mixed with 8.4 grs. of β-naphthylamine in 150 cc. of alcohol. The reaction product separates spontaneously and is recrystallized from alcohol or butyl alcohol. It forms brown needles, but a red powder. Its melting point is 243 to 244° C., its composition $C_{17}H_{14}ON_4$.

5.8 grs. of this dyestuff are dissolved in 100 cc. of benzene and after addition of 2.6 grs. of potassium carbonate and of 4 grs. of trichloroacetyl chloride, the mixture is boiled for 4 hours. The solution is filtered, evaporated in vacuo, and the residue is washed with water and recrystallized from glacial acetic acid. The product forms crimson-red needles melting at 230° C. under decomposition. Its composition is $C_{19}H_{13}O_2N_4Cl_3$.

EXAMPLE 11

*N-10.11-dibromo-undecanoyl-1-(p-carbethoxybenzene)-azo-2-naphthylamine*

The 10.11-dibromo-undecanic acid required is prepared from undecylenic acid and bromine in carbon disulfide. The acid chloride is synthetized by means of thionyl chloride which is employed in an excess of a hundred per cent over the theoretically required amount, at a temperature of about 50° C. The excess of thionyl chloride is evaporated and the crude reaction product is used for the further reaction.

16 grs. of the azo-dye, dissolved in 150 cc. of chloroform and 4 cc. of pyridine, are treated at 0° C. with a solution of 20 grs. of dibromo-undecanoyl chloride. After 12 hours' standing, the solution is evaporated and the residue, after trituration with a mixture of methyl alcohol and ethyl alcohol (1:2), extracted with boiling methyl alcohol in order to remove impurities. The insoluble product is finally purified by recrystallisation from propyl alcohol. It has the melting point 124° C. and the composition $C_{30}H_{35}O_3N_3Br_2$.

EXAMPLE 12

*N-trichloroacetyl-1'-amino-naphthalene-(2'-azo-1)-benzene-4-arsonic-4'-sulfonic acid*

The azo-dye prepared from diazotized arsanilic acid and naphthionic acid is converted into its dipotassium salt. 5 grs. of this salt are suspended in 50 cc. of toluene and after addition of 1.8 grs. of trichloroacetyl chloride, the mixture is heated to 100° C. for 2 hours. The mono-potassium salt of the reaction product is separated from the hot solution and recrystallized from water. It forms a dark-red powder and is converted into the corresponding acid in the usual way. The composition of the latter is $C_{18}H_{13}O_7N_3Cl_3AsS$.

EXAMPLE 13

*N-trichloroacetyl-1'-amino-naphthalene-(2'-azo-1)-benzene-4-arsonic acid-4'-sulfonamide*

The hitherto unknown coupling product of arsanilic acid with naphthionamide is prepared in the following way:

1.09 grs. of sodium p-amino phenyl arsonate (atoxyl) are dissolved in 125 cc. of water and 40.8 cc. of concentrated sulfuric acid, and treated at 0° C. with 3.5 grs. of sodium nitrite in 18 cc. of water. This diazonium solution is added to a solution of 11.1 grs. of naphthionamide in 200 cc. of alcohol. After 2 hours' standing, 100 cc. of a saturated sodium acetate solution are added, and after another 12 hours the condensation product is filtered off and washed with water. The red dyestuff obtained is dissolved in a solution of 4.2 grs. of sodium bicarbonate in 200 grs. of water, filtered, and precipitated while hot with 10 cc. of glacial acetic acid. The phosphorous-red crystals are dried and recrystallized from 2-ethyl hexanol. From this solvent, a beautiful deposit of cherry-red leaflets of melting point 195° C. is obtained which contains about one molecule of the octyl alcohol. The yield is 18 grs., and the composition $C_{16}H_{15}O_5N_4AsS + C_8H_{18}O$.

In order to obtain the substance free from the solvent, 20 grs. thereof are boiled with 500 cc. of alcohol, and the brick-red crystals obtained are filtered off. They melt at 271° C. under decomposition.

The sodium salt of the above dyestuff is easily obtained by dissolving the latter in the calculated amount of boiling sodium carbonate solution and adding an equal volume of alcohol. The salt forms orange-yellow crystals.

4.5 grs. of the salt are suspended in 80 cc. of benzene and boiled with 6 grs. of trichloroacetic acid anhydride for 3 hours. The crystals formed are filtered, washed with water, alcohol and ether, and form a brick-red powder melting at 293° C. under decomposition.

EXAMPLE 14

*N-trichloroacetyl-p-amino-benzene-sulfonamide*

8.6 grs. of p-amino-benzene-sulfonamide are suspended in 50 cc. of chloroform containing 4 cc. of pyridine, and after addition of 9.1 grs. of trichloroacetyl chloride in 25 cc. of chloroform, the mixture is left at room temperature for 12 hours. The reaction product is filtered off and recrystallized from a 50 per cent aqueous acetic acid. It forms leaflets of melting point 250° C. If the solution is cooled very slowly, strongly birefringent rhombohedra are obtained. The yield is 80%, and the composition of the product is $C_8H_7O_3N_2Cl_3S$.

EXAMPLE 15

N-trichloroacetyl-1-amino-naphthalene-2-sulfonic acid 6.1 grs. of the sodium salt of 1-amino-naphthalene-2-sulfonic acid and 10 grs. of trichloroacetic anhydride in 100 cc. of benzene are boiled for 8 hours. The solution is filtered while hot, treated with charcoal, filtered again, and the reaction product is precipitated by the addition of ether. It is readily soluble in alcohol but can be recrystallized from water from which it is obtained in shiny leaflets having the composition $C_{12}H_6O_4NCl_3S + 5H_2O$.

EXAMPLE 16

N-dichloroacetyl-p-amino-benzene-sulfonamide

A suspension of 8.6 grs. of p-amino-benzene-sulfonamide in 50 cc. of chloroform which contains 4 cc. of pyridine is added to at 0° C. with a solution of 7.3 grs. of dichloroacetyl chloride in 25 cc. of chloroform. After 12 hours' standing the reaction is complete. The reaction product which is soluble in boiling water, acetic acid, acetone and dioxane, but insoluble in hydrocarbons, is recrystallized from a 70 per cent alcohol. It has the melting point 218° C. and composition $C_8H_8O_3N_2Cl_2S$.

The same product can be obtained by the following alternative method:

8.6 grs. of p-amino-benzene-sulfonamide are dissolved in a mixture of 45 cc. of glacial acetic acid and 45 cc. of a saturated sodium acetate solution. The mixture is cooled under stirring down to —5° C. and 11 parts of dichloroacetyl chloride in 20 cc. of glacial acetic acid are added. After 12 hours' standing, the precipitate is filtered off and recrystallized as above.

EXAMPLE 17

N-trichloroacroyl-p-amino-benzene-sulfonamide 17.2 grs. of p-amino-benzene-sulfonamide in a mixture of 80 cc. of glacial acetic acid and 80 cc. of a saturated sodium acetate solution are treated at —5° C. with a solution of 30 grs. of trichloroacroyl chloride in 25 cc. of chloroform. After 12 hours' standing the reaction product is filtered off and recrystallized from 80 per cent formic acid. It has the melting point 258° C. and composition $C_9H_7O_3N_2Cl_3S$.

EXAMPLE 18

N-trichloroacroyl-naphthionamide 8.8 grs. of naphthionamide, 5 grs. of trichloroacroyl chloride (see Example 6) and 6 grs. of anhydrous potassium carbonate are boiled in 100 cc. of toluene for 4 hours. The solid reaction product is recrystallized from 60 per cent acetic acid and forms leaflets, melting at 234° C. under decomposition. Composition $C_{12}H_9O_3N_2Cl_3S$.

EXAMPLE 19 p-11.12-dibromo-undecanoyl-amino-benzene-sulfonamide 8.6 grs. of p-amino-benzene-sulfonamide are dissolved in a hot mixture of 45 cc. of glacial acetic acid and 45 cc. of saturated sodium acetate solution, and 20 grs. of dibromo-undecanoyl chloride are added at —5° C. The reaction product is recrystallized first from 80 per cent acetic acid then from propyl alcohol. It melts at 173–175° C. and has the composition $C_{17}H_{26}O_3N_2Br_2S$.

The same product may be obtained by the following alternative method: To a solution of 34.4 grs. of p-amino-benzene-sulfonamide in 200 cc. of chloroform and 16 cc. of pyridine, 40 grs. of dibromo-undecanoyl chloride are added at 0° C. After 12 hours' standing the reaction product is boiled for one hour, the part of the reaction product which crystallizes spontaneously is collected, the mother liquor is evaporated, and the residue treated with water. The whole of the solid product is triturated with 80 per cent. acetic acid and recrystallized from alcohol. Yield 55 grs.

EXAMPLE 20

Trichloroacetyl-arsanilic acid 7.2 grs. of sodium p-aminophenyl arsonate and 9 grs. of trichloroacetyl chloride are heated in 30 cc. of toluene for one hour at 100° C. Already on mixing the components, the reaction begins. The reaction product is cooled down to room temperature, filtered, thoroughly washed with water and recrystallized from 50 per cent. formic acid. It forms shiny leaflets of the composition $C_8H_7O_4N.Cl_3As$.

The product was tested against trypanosoma gambiense. The curative dose was 0.2 gr. per kg.; the lethal dose 0.3 gr. per kg.

EXAMPLE 21

N.N'-trichloroacetyl-4.4'-diamino-arsenobenzene 3 grs. of trichloroacetyl arsonic acid, 40 grs. of 50 per cent. acetic acid and 40 grs. of hypophosphorous acid are heated to 70° C. for 2 hours. The reaction product precipitates in form of yellowish silky needles which after washing with alcohol are analytically pure. The substance decomposes at 190° C.; it is soluble in ethylene diamine. Composition: $C_{16}H_{10}O_2N_2Cl_6As_2$.

EXAMPLE 22

N-dichloroacetyl-arsanilic acid 6 grs. of sodium p-aminophenyl arsonate and 4 grs. of dichloroacetyl chloride are heated in 30 cc. of toluene at 100° C. for 2 hours. The solid reaction product is collected, washed with water, and recrystallized from 70 per cent. acetic acid. It forms fine needles easily soluble in hot alcohol and in acetone.

The same product can be obtained by the following second method: A solution of 12 grs. of sodium p-amino-phenyl arsonate and 6.5 grs. of sodium acetate in 50 cc. of water is cooled to —5° C. and while stirring, 8 grs. of dichloro-acetyl chloride are added. After 12 hours' standing the reaction product is filtered and recrystallized as above. Yield 60 per cent., composition $C_8H_8O_4NCl_2As$. The substance was tested against trypanosoma gambiense; the curative dose was 0.1 gr. per kg., the lethal dose 0.4 gr. per kg. Under the same conditions atoxyl (sodium p-aminophenyl arsonate) had a curative dosis of 0.55 gr. per kg.; and the lethal dosis of 0.6 per kg. The monochloroacetyl derivative (compare "Berichte der deutschen chemischen Gesellschaft," vol. 44, p. 3451, 1911) has no curative effect at all, while the lethal dosis thereof is 0.2 gr. per kg.

EXAMPLE 23

*N-trichloroacroyl-arsanilic acid*

24 grs. of sodium p-aminophenyl arsonate and 22 grs. of trichloroacroyl chloride in 200 cc. of benzene are heated on a water bath for 2 hours under constant stirring.

The reaction product precipitated is filtered off, washed with water and recrystallized from 50 per cent. acetic acid; it forms clusters of needles. The yield is 63 per cent, composition $C_9H_7O_4NCl_3As$.

EXAMPLE 24

*N-11.12-dibromo-undecanoyl-arsanilic acid*

12 grs. of sodium p-aminophenyl arsonate and 20 grs. of dibromo-undecanoyl chloride in 150 cc. of benzene are boiled for 6 hours. The reaction product obtained is collected and recrystallized from 50 per cent. acetic acid. Composition: $C_{17}H_{26}O_4NBr_2As$.

The maximum tolerated dosis is 0.15 gr. per kg.; the lethal dosis 0.175 gr. per kg.

We claim:

1. Lipophilic chemotherapeutical substances being mono-azo compounds of the benzene-azo-naphthalene series having an acylamino group with at least two halogen substituents and at least one further substituent selected from the group consisting of the carboxy, carbonamide, carbethoxy, arsonic, sulfonic, sulfonamide and amino groups.

2. Lipophilic chemotherapeutical substances being mono-azo compounds of the benzene-azo-naphthalene series, having an acylamino group with at least two halogen substituents.

3. Lipophilic chemotherapeutical substances being mono-azo compounds of the benzene-azo-naphthalene series, having a dihalogen acylamino group.

4. Lipophilic chemotherapeutical substances being mono-azo compounds of the benzene-azo-naphthalene series, having a trihalogen acylamino group.

5. Lipophilic chemotherapeutical substances being mono-azo compounds of the benzene-azo-naphthalene series, having a saturated acylamino group with at least two halogen substituents.

6. Lipophilic chemotherapeutical substances being mono-azo compounds of the benzene-azo-naphthalene series, having an unsaturated acylamino group with at least two halogen substituents.

7. The process of preparing lipophilic substances, which comprises combining at least one molecule of an aliphatic acyl compound having at least two halogen substituents bound to at least one carbon atom not being that constituting the carboxylic group, with at least one amino group present as a nuclear substituent in a mono-azo compound of the benzene-azo-naphthalene series.

8. Process as claimed in claim 7, wherein the aliphatic acyl compound is an acid halogenide containing at least two halogen substituents besides the halogen atom bound to the carboxylic group.

9. Process as claimed in claim 7, wherein the aliphatic acyl compound is an acid anhydride containing at least two halogen substituents.

ERNST BERGMANN.
FELIX BERGMANN.
LEON HASKELBERG.